Oct. 5, 1954

L. SKEEL 2,690,611

METAL-CUTTING TOOL

Filed Nov. 13, 1950

INVENTOR.
LEWIS SKEEL
BY
E. F. Salter

Oct. 5, 1954
L. SKEEL
2,690,611
METAL-CUTTING TOOL
Filed Nov. 13, 1950
2 Sheets-Sheet 2
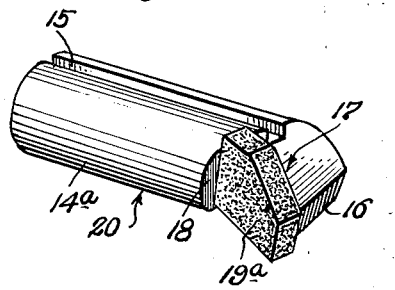
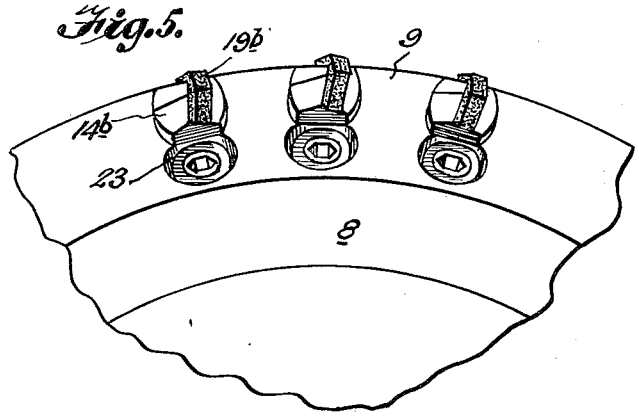
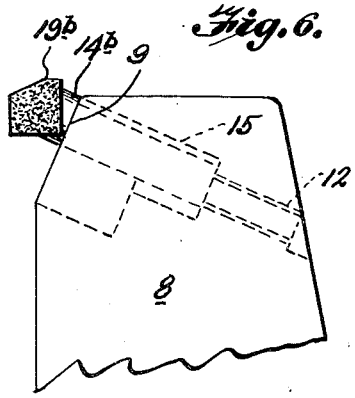
INVENTOR.
LEWIS SKEEL
BY
E. F. Salter Patented Oct. 5, 1954

2,690,611

UNITED STATES PATENT OFFICE 2,690,611

METAL-CUTTING TOOL

Lewis Skeel, Meadville, Pa., assignor to McCrosky Tool Corporation, Meadville, Pa., a corporation of Pennsylvania Application November 13, 1950, Serial No. 195,450

6 Claims. (Cl. 29—105)

The present invention relates to cutting tools of the inserted-blade or inserted-bit type, and more particularly to an improved tool-head or body for mounting releasable and replaceable cutting blades or bits, and quick-acting blade or bit locking means.

Inserted-blade tools of the prior art require slots or holes in the tool body set at different axial and radial angles to suit each different type of cutting material used in the cutting blades or bits. Commonly used cutting materials include high-speed steel, cast alloy, cemented carbide for cast iron and cemented carbide for steel. Each of these cutting materials requires its own individual combination of axial and radial cutting angles for cutting efficiency. Consequently a separate tool-head or body is required for each different kind of cutting material. In addition, inserted-blade tools of the prior art require the use of one type of tool-head or body for right-hand cutting and another for left-hand cutting.

The primary object of the present invention is to provide a tool-head or body that is universal in that it can be fitted with blades or bits to produce either a right-hand or left-hand cutting tool, and further can be fitted with blades and bits of any cutting material.

Another important object of the invention is to provide a tool-head or body in which can be mounted a much larger than the usual number of blades or bits.

A further object resides in the provision of a novel form of tool holder containing at least one pair of cylindrically rounded holes arranged substantially in parallelism and in intersection with each other to afford sockets for the reception of a cutting blade or bit and its locking means.

Still another object is to devise a new and improved cutting blade or bit for insertion in a tool-head or body.

Another object of the invention is to provide a tool-head or body that is of simple construction and relatively inexpensive to manufacture, and which will still produce an assembled tool that is very strong and efficient in use Other objects and advantages of the invention will be apparent during the course of the following description when taken in conjunction with the accompanying drawings, wherein:

Figure 4 is a perspective view of one of the blades of Figure 2.

Figure 5 is a view similar to Figure 2, left-hand blades having been substituted.

Figure 3:
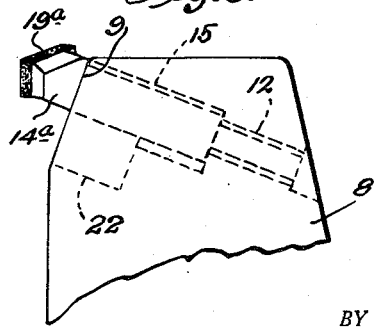
Figure 3 represents a fragmentary side elevational view of the assembly of Figure 2, looking toward the right side of Figure 2.

Figure 6 corresponds to Figure 3 but is taken upon Figure 5.

Figure 1:
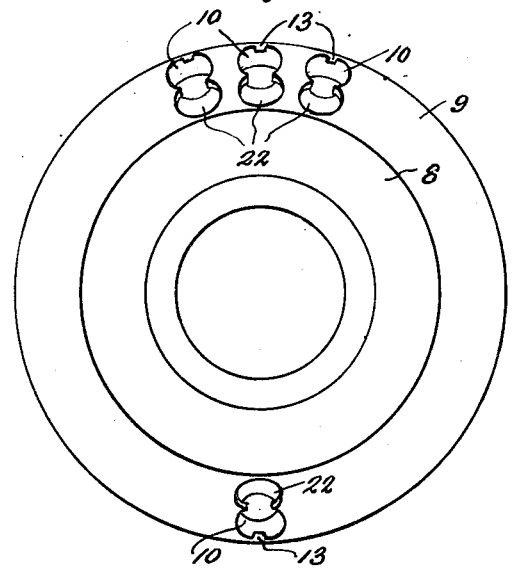
Figure 1 is a face view of a milling cutter head incorporating a portion of the present invention, the cutting blades and wedges having been removed to reveal the ararngement of the holes that receive them.

With continued reference to the drawings, and first to Figures 1 and 3, there is shown a rotary face milling cutter body 8 of substantially cylindrical form, this body having an inclined perimetral surface 9. Perpendicular to this surface and from its outer edge there is machined a plurality of cylindrical sockets 10 for free reception of cutting blades (removed in Fig. 1), thus inclining the sockets so that they are completely surrounded by a great amount of metal. Desirably there will be for each socket a second hole 12, aligned with but of smaller diameter than the socket, internally threaded to receive an adjusting or back-up screw. The purpose of such arrangement is to permit the blade to be adjusted outwardly to compensate for wear of the blade tip.

At the extreme outer edge of each socket a small portion of the body metal is swaged or staked inwardly to form a tongue 13, preferably rectangular in cross-section and for a purpose later to be seen.

Figure 2:
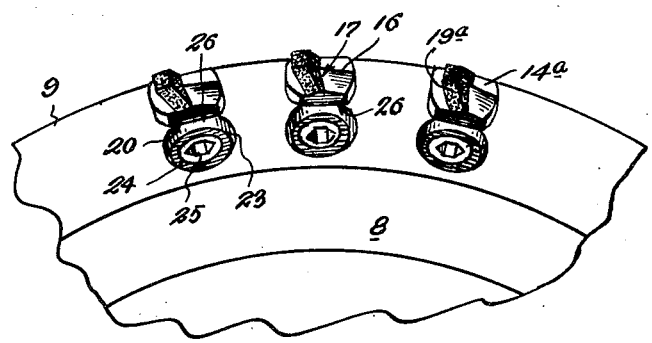
Figure 2 is a fragmentary view of the head of Figure 1 with blades and wedges inserted, these blades being designed for right-hand cutting.

As shown in Figures 2 and 3, each socket 10 freely receives a blade shank 14a that is in large part cylindrically curved. This shank has a longitudinal groove 15 complemental to its associated tongue 13 and thus holds the blade in proper position against undesirable rotation. The front or working end 16 of the shank is machined to reduce it in thickness and also to provide an inclined surface 17 which cooperates with a shoulder 18 to form a seat or recess for a carbide tip 19a that is either cemented or brazed in place.

The cutting angles, radial and axial, variable for each different type of cutting material, are provided by properly machining the front end of the blade. It should be understood that when the blades are made from high-speed steel, the entire blade is a solid length of high-speed steel, and the proper cutting angles for high-speed steel are rough machined on the front end of the blade before hardening, and finish ground after hardening. When the cutting materials are cast alloy, or cemented carbide as illustrated herein, the blade shank is made of a suitable alloy steel and is preformed as described by machining the front end to provide the proper cutting angles after which the cast alloy or cemented carbide tip is added.

The various cutting angles for different kinds of cutting materials are all located from the radial line that passes through the center of the blade socket and this radial line remains constant in the assembled cutter. Consequently, blades of all kinds of cutting materials can be used in the same body. The cutting angles of right-hand blades are located on one side, as in Figures 2–4, and the cutting angles of left-hand blades on the opposite side of the same radial line, as seen at 14b and 19b in Figures 5 and 6. For this reason right or left-hand blades of any cutting materials can be used in the same body. With one universal cutter body and different sets of blades, the user can adapt the cutter to the most suitable cutting material for a particular job and further can set up the cutter for either hand of cut.

As best seen in Figures 1 and 3, a second series of holes 22 is provided, each paired with one of the sockets 10 in parallelism therewith. These are shorter than the sockets and may differ therefrom in diameter. Although they might be aligned circumferentially with the sockets, it is desirable that they be located inwardly in order to permit the installation of a maximum number of blades for some conditions of use. For the particular blade illustrated it is greatly preferable that the axes of each socket and its corresponding hole be located in a common radial plane, thus permitting the aforementioned interchangeability of right and left-hand cutting blades or bits.

It is essential that the sockets and holes overlap one another to permit coaction of blades and their locking means. In the illustrated form of invention the radial distance between their axes is less than their combined radii and preferably such that the resulting arcs subtended by a common chord are both more than 180 degrees. The arcs are entirely surrounded by the body metal. The proper coaction of the blade and its locking means can be effected only when the blade socket 10 and the hole 22 are so located that a line perpendicular to the common chord at its center passes through the center of socket 10, the center of hole 22 and the center of the locating tongue 13.

Each blade shank has a flat side 20 substantially within the plane of the chord just mentioned and engaged by the flat side 26 of a locking unit mounted in the adjacent hole. The locking unit comprises a partially cylindrical carrier 23 for a wedge member 24 that can be operated by a screw threaded element 25. This unit is of the general type disclosed in Patent No. 2,508,437 and it is specifically shown in Figure 9 of my pending application Serial No. 719,535, filed December 31, 1946, now Patent No. 2,647,789. It per se forms no part of the present invention.

Because the wedging means is located beneath the blade, no space in the extreme periphery of the cutter body has to be sacrificed for wedging space and provision can be made for mounting a very large number of blades for those jobs that should be machined at high speeds and feeds without greatly increasing the chip load per tooth. Because the blade shanks are entirely surrounded by body metal, the assembled cutter is very strong and rigid regardless of the number of blades mounted.

The body design described above provides definite manufacturing advantages. The machining of a series of pairs of holes can be performed at one set-up. Body blanks can be maintained in stock and from that stage quickly machined to provide the most suitable number of blades for a specific job. The round holes completely surrounded by metal permit the body to be toughened by heat-treating without undue risk of distortion.

In addition to face milling cutters described above, the invention can be embodied in other types of inserted-bit cutting tools, such as boring tools, turning tools, surface broaches, etc. In these other embodiments of the invention, each pair of holes provides for the mounting of a cutting blade or bit of any selected cutting material in one and the same body and provides further for the mounting of a right or left-hand cutting blade or bit in the same body for use with machines that are designed for both right and left-hand cutting operations. In tools of the type just described, the centers of the two holes will fall on a line that is perpendicular to the common subtended chord and the center of the tongue that is staked in the periphery of the blade-receiving hole will also fall on that same perpendicular line. This same relation between the centers of the two holes and the center of the tongue will exist in a rotary cutter body in which the two holes are aligned circumferentially rather than radially or in a rotary cutter body in which the holes are aligned vertically but located in the body ahead of or behind center.

What is claimed is:

1. In combination, a rotary metal head having a substantially transverse round hole with its axis in a radial plane, said hole having a longitudinal gap but otherwise surrounded by metal, said head having a tongue diametrically opposite said gap extending into said hole, a blade linearly slidable into said hole having a groove receiving said tongue and a locking surface facing said gap, the center of said tongue and groove being disposed in said radial plane, and locking means carried by said head for engaging said surface by way of said gap, whereby said blade may be designed for either right-hand or left-hand cutting.

2. In the combination defined in claim 1, said head having a second hole within which said locking means is mounted and with its axis in said radial plane, said second hole intersecting said round hole and opening into said gap.

3. In a cutting tool of the class described, a rotary metal head having an inclined hole that closely approaches the front outer edge of the head where it emerges therefrom, the axis of said hole being in the radial plane of the head axis and the hole being symmetrical with respect to said plane, a metal tongue forced slightly into said hole at said front edge from the metal of said head, and a blade complemental to and slidable into said hole and having a longitudinal groove complemental to and designed to slide along said tongue.

4. In the combination defined in claim 3, said head being rotary and said tongue located substantially in the radial plane of the axis of the hole.

5. A rotary metal head in which there are one or more pairs of transverse round holes, the axes of the two holes in each pair being disposed in parallelism and in the same radial plane, the distance between said axes being less than the combined radii of said two holes, one of said two holes having a metal tongue forced slightly into it just at the front outer edge of said head where said hole emerges therefrom, the center of said tongue being disposed in said same radial plane.

6. A tool holder in which there are one or more pairs of round holes, the axes of the two holes in each pair being disposed in parallelism, the distance between said axes being less than the combined radii of said two holes, one of said two holes having a very short metal tongue forced slightly into it at the front outer edge of said holder where said hole emerges therefrom, the centers of said two holes and the center of said tongue all lying on the same straight line.

References Cited in the file of this patent

UNITED STATES PATENTS

| Number | Name | Date |
| --- | --- | --- |
| 161,835 | Squire | Apr. 6, 1875 |
| 916,407 | Barry | Mar. 30, 1909 |
| 992,860 | Dette | May 23, 1911 |
| 1,019,564 | Unterloff | Mar. 5, 1912 |
| 1,034,724 | Mueller | Aug. 6, 1912 |
| 1,315,978 | McQuestion | Sept. 16, 1919 |
| 1,324,809 | Giles | Dec. 16, 1919 |
| 1,415,237 | Guttly | May 9, 1922 |
| 1,577,952 | Carnegie | Mar. 23, 1926 |
| 1,747,455 | Miller | Feb. 18, 1930 |
| 1,820,415 | Wildhauber | Aug. 25, 1931 |
| 2,348,759 | Sneed | May 16, 1944 |
| 2,418,734 | Steffes | Apr. 8, 1947 |
| 2,423,419 | Stuber | July 1, 1947 |

FOREIGN PATENTS

| Number | Country | Date |
| --- | --- | --- |
| 25,426 | Great Britain | Mar. 19, 1914 |
| 639,824 | France | Mar. 17, 1928 |

OTHER REFERENCES

Metal Cutting Data, vol. V, No. 4, October 1948.